US009147379B2

(12) United States Patent
Deffeyes et al.

(10) Patent No.: US 9,147,379 B2
(45) Date of Patent: *Sep. 29, 2015

(54) POSITIONAL CONTEXT DETERMINATION WITH MULTI MARKER CONFIDENCE RANKING

(71) Applicant: International Business Machines Corporation, Armonk, NY (US)

(72) Inventors: Suzanne C. Deffeyes, Austin, TX (US); Richard J. Newhook, West Chester, PA (US)

(73) Assignee: International Business Machines Corporation, Armonk, NY (US)

( * ) Notice: Subject to any disclaimer, the term of this patent is extended or adjusted under 35 U.S.C. 154(b) by 164 days.

This patent is subject to a terminal disclaimer.

(21) Appl. No.: 13/776,534

(22) Filed: Feb. 25, 2013

(65) Prior Publication Data

US 2013/0169684 A1 Jul. 4, 2013

Related U.S. Application Data

(63) Continuation of application No. 13/174,669, filed on Jun. 30, 2011, now Pat. No. 8,872,852.

(51) Int. Cl.
*G09G 5/00* (2006.01)
*G09G 5/377* (2006.01)
*G06T 19/00* (2011.01)

(52) U.S. Cl.
CPC ............. *G09G 5/377* (2013.01); *G06T 19/006* (2013.01)

(58) Field of Classification Search
None
See application file for complete search history.

(56) References Cited

U.S. PATENT DOCUMENTS 5,275,354 A 1/1994 Minor et al.
5,283,422 A 2/1994 Storch et al.
(Continued)

FOREIGN PATENT DOCUMENTS

CN 101661163 3/2010
CN 101739710 6/2010
(Continued)

OTHER PUBLICATIONS

Ellis, Stephen R., "Distance perception of stereoscopically presented virtual objects optically superimposed on physical objects by a head-mounted see-through display", Proceedings of the Human Factors and Ergonomics Society. 38th Annual Meeting 1994.
(Continued)

*Primary Examiner* — Yingchun He
(74) *Attorney, Agent, or Firm* — DeLizio Law, PLLC

(57) ABSTRACT

A computer implemented method for augmenting a display image includes receiving image data, the image data including data representing one or more objects, and at least a first marker and a second marker. The method includes receiving a first confidence level for the first marker and a second confidence level for the second marker. The method includes determining a selected marker from the first marker and the second marker. The selected marker is determined according to a highest confidence level of the first confidence level and the second confidence level. The method includes determining a transformation and a positional offset for the selected marker. The method includes generating overlaid display data for the one or more objects in the image data, the one or more objects determined in accordance with the transformation and the positional offset.

4 Claims, 5 Drawing Sheets

(56) References Cited

U.S. PATENT DOCUMENTS

| | | | |
|---|---|---|---|
| 5,699,444 | A | 12/1997 | Palm |
| 7,706,603 | B2 | 4/2010 | Najafi et al. |
| 2002/0044104 | A1 | 4/2002 | Friedrich et al. |
| 2005/0102050 | A1 | 5/2005 | Richey |
| 2005/0203380 | A1 | 9/2005 | Sauer et al. |
| 2005/0276444 | A1 | 12/2005 | Zhou et al. |
| 2005/0278156 | A1 | 12/2005 | Fisher, III et al. |
| 2005/0285878 | A1 | 12/2005 | Singh et al. |
| 2005/0288078 | A1 | 12/2005 | Cheok et al. |
| 2005/0289590 | A1 | 12/2005 | Cheok et al. |
| 2006/0184357 | A1* | 8/2006 | Ramsey et al. ............ 704/9 |
| 2008/0267454 | A1 | 10/2008 | Kobayashi et al. |
| 2010/0092079 | A1 | 4/2010 | Aller |
| 2010/0259537 | A1 | 10/2010 | Ben-Himane et al. |
| 2011/0081892 | A1 | 4/2011 | Graham et al. |
| 2011/0153564 | A1 | 6/2011 | Cochinwala et al. |
| 2013/0002717 | A1 | 1/2013 | Deffeyes et al. |

FOREIGN PATENT DOCUMENTS

| | | |
|---|---|---|
| EP | 0769770 | 4/1997 |
| EP | 1183578 | 3/2002 |
| JP | 2002538542 | 11/2002 |
| JP | 2005250950 | 9/2005 |
| KR | 20060065159 | 6/2006 |
| KR | 100777215 | 11/2007 |
| KR | 20100026240 | 3/2010 |
| WO | 0052539 | 9/2000 |
| WO | 2005050515 | 6/2005 |
| WO | 2010024486 | 3/2010 |
| WO | 2010046123 | 4/2010 |

OTHER PUBLICATIONS

Jayaram, Sankar et al., "Design of an automated calibration system for electromagnetic tracking systems", 2008 Proceedings of the ASME International Design Engineering Technical Conferences and Computers and Information in Engineering Conference http://vrcim.wsu.edu/pages/publications/2008/VRCIM-2008-02-ABS.pdf (Obtained from the Internet on Jun. 22, 2011) 2008 , 1 page.

Kawsar, Fahim et al., "A smart object centric indoor location model for future ubiquitous and grid services", Journal of Internet Technology vol. 10 (2009) No. 5 http://jit.ndhu.edu.tw/paper/jit20091130_003.pdf (Obtained from the Internet on Jun. 21, 2011) 2009 , pp. 483-496.

Le Louarn, Miska et al., "Sky coverage and PSF shape with LGS AO on 8 m telescopes", Proceedings of SPIE—The International Society for Optical Engineering www.eso.org/~lelouarn/spie3353.ps.gz (Obtained from the Internet on Jun. 22, 2011) 1998 , 7 pages.

Mayo-Wells, W. J., "Performance Requirements and Test Procedure TOE-21 Voltage Controlled Oscillator", Oct. 30, 1952 , 12 pages.

Naniwa, Tomohide et al., "A learning control method for coordination of multiple manipulators holding a geometrically constrained object", Advanced Robotics , vol. 13 , No. 2 1999 , pp. 139-152.

Rahman, Ashfaqur et al., "Location finding using computer vision based approach", International Journal of Information and Communication Technology , vol. 1 , No. 3-4 2008.

Rekimoto, Jun et al., "CyberCode: Designing Augmented Reality Environments with Visual Tags", Apr. 2000 , 10 pages.

Saha, Punam K. et al., "Iso-shaping rigid bodies for estimating their motion from image sequences", IEEE Transactions on Medical Imaging , vol. 23 , No. 1 http://ieeexplore.ieee.org/stamp/stamp.jsp?arnumber=1256428 (Obtained from the Internet on Jun. 21, 2011) Jan. 2004 , pp. 63-72.

Wither, Jason et al., "Pictorial Depth Cues for Outdoor Augmented Reality", Proceedings. Ninth IEEE International Symposium on Wearable Computers http://citeseerx.ist.psu.edu/viewdoc/summary?doi=10.1.1.157.96 (Obtained from the Internet on Jun. 21, 2011) Oct. 18-21, 2005 , 8 pages.

"International Application No. PCT/IB2012/053297 Search Report", Nov. 15, 2012 , 7 pages.

"U.S. Appl. No. 13/174,669 Final Office Action", Mar. 21, 2014, 22 Pages.

Azuma, Ronald T. , "A Survey of Augmented Reality", In Presence: Teleoperators and Virtual Environments Aug. 1997 , pp. 355-385.

"U.S. Appl. No. 13/174,669 Office Action", Nov. 15, 2013 , 19 pages.

U.S. Appl. No. 13/174,669, filed Jun. 30, 2011, Deffeyes, Suzanne C., et al.

* cited by examiner

108

110

US 9,147,379 B2

POSITIONAL CONTEXT DETERMINATION WITH MULTI MARKER CONFIDENCE RANKING

RELATED APPLICATIONS

This application claims the priority benefit of U.S. application Ser. No. 13/174,669 filed Jun. 30, 2011.

BACKGROUND

Embodiments of the inventive subject matter generally relate to the field of computer image processing systems, and, more particularly, to determining positional context using confidence ratings for multiple markers in an image.

Augmented reality is the practice of adding visual content on top of images from a video camera. An augmented reality application may be used to provide additional information about objects in the field of view of a camera on a mobile device. For example, a user of an augmented reality system may point the camera of a mobile device at a restaurant. The augmented reality system may cause information such as reviews, menus, hours of operation etc. to be overlaid with the video of the restaurant.

Current mechanisms for implementing augmented reality typically use GPS, compass and accelerometer data to determine the position of a mobile device. Unfortunately, GPS is not reliable when the mobile device is used indoors. In addition, positional accuracy can be a problem with current systems in that they can only achieve a positional accuracy within one to three feet. This level of accuracy is not sufficient when objects in an image are close together.

SUMMARY

A computer implemented method for augmenting a display image includes receiving image data, the image data including data representing one or more objects, and at least a first marker and a second marker. The method includes receiving a first confidence level for the first marker and a second confidence level for the second marker. The method includes determining a selected marker from the first marker and the second marker. The selected marker is determined according to a highest confidence level of the first confidence level and the second confidence level. The method includes determining a transformation and a positional offset for the selected marker. The method includes generating overlaid display data for the one or more objects in the image data, the one or more objects determined in accordance with the transformation and the positional offset.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Figure 1:
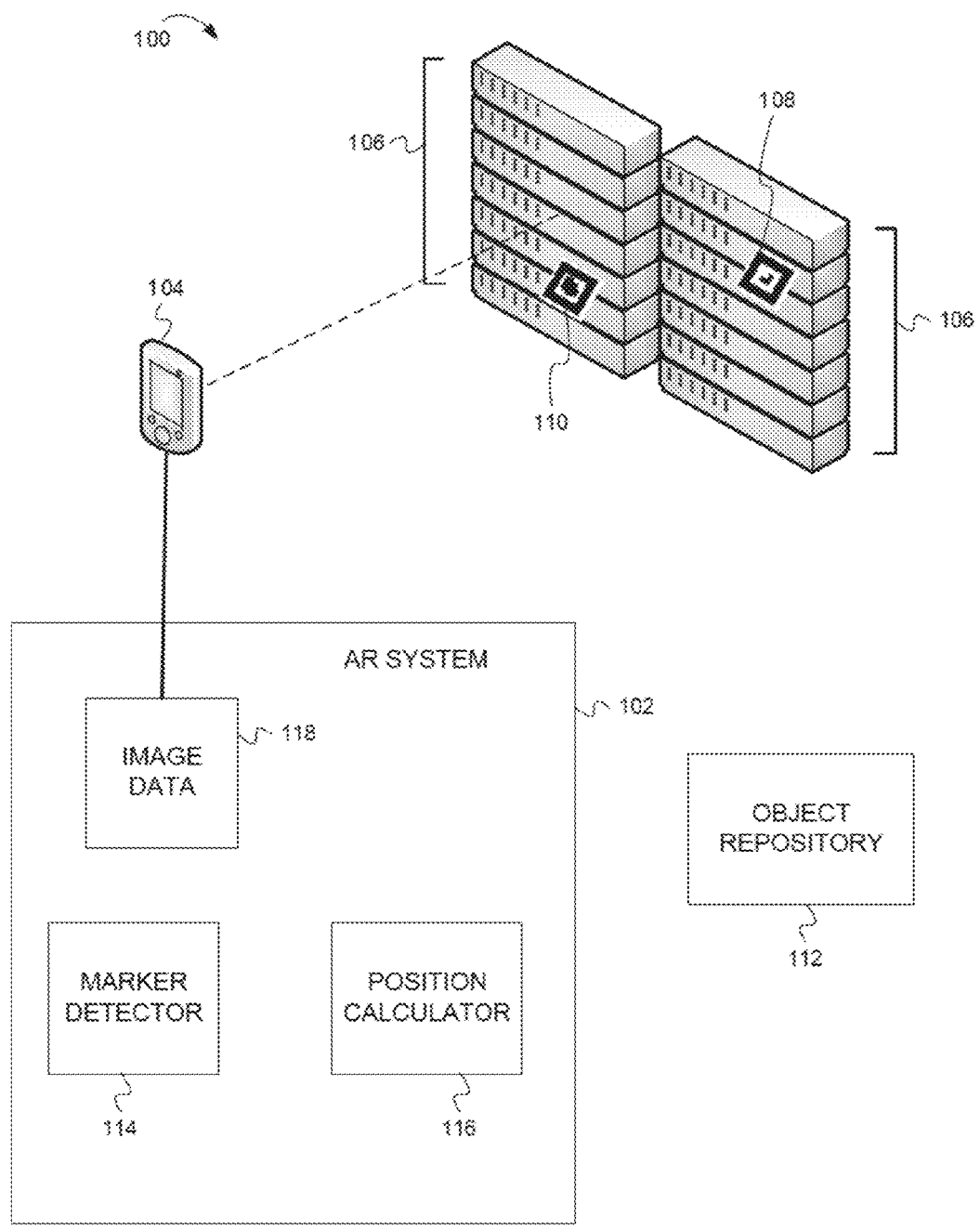
FIG. 1 depicts an example system for determining positional context using images containing multiple markers.

FIG. 1 depicts an example system 100 for determining positional context using images containing multiple markers. In some embodiments, system 100 includes an augmented reality (AR) system 102, object repository 112, and user device 104. User device 104 may be any type of device that includes a camera for providing images of objects 106. User device 104 also includes a network interface for transmitting image data received from the camera to AR system 102. Examples of such devices include mobile phones, personal digital assistants and music players. The embodiments are not limited to any particular user device 104.

In the example illustrated in FIG. 1, objects 106 comprise computer systems mounted in racks. Each of the two racks illustrated in FIG. 1 have seven computer systems. It is important to note that the racks of computer systems shown in FIG. 1 provide a convenient use case to illustrate the embodiments. Those of skill in the art having the benefit of the disclosure will appreciate that the inventive subject matter described herein applies to virtually limitless types of objects depicted in image data.

Also illustrated in FIG. 1 are two markers, marker 108 and marker 110, positioned proximate to objects 106. The markers may be permanently attached to an object or they may be removably attached to an object. While the embodiments do not require any particular positioning of markers on objects, it is desirable to position the markers such that at least two markers are present in any image taken by a camera from likely positions. For example, in some example configurations, markers are placed assuming a camera distance of one to four feet from the objects. Such placement generally leads to the desirable quality that when the camera is moved, should one marker leave the image, another comes into the image to replace the one that leaves the image.

Object repository 112 comprises a data repository having data describing objects 106. Various types of data regarding objects 106 may be maintained in object repository 112. For example, for each object, object repository may include an object identifier uniquely identifying the object, a description of the object, and a position of the object in a three-dimensional space. Object repository 112 also maintains identification data and three-dimensional position data for markers 108 and 110. Although illustrated as a single repository in FIG. 1, object repository 112 may comprise multiple repositories and further may be distributed across multiple computing systems.

AR system 102 receives image data 118 from user device 104 through a network or networks that communicably couple user device 104 and AR system 102. AR system 102 includes a marker detector 114 and a position translator 116. Marker detector 114 scans image data 118 to determine if any markers are present in image data 118. Marker detector 114 may compare portions of image data 118 to data for known markers to determine if any markers are present in the image data. Upon detecting a possible marker in image data 118, marker detector 114 identifies the marker, i.e., determines which marker has been potentially detected, and determines a confidence level that indicates a probability that the possible marker is in fact the identified marker. For example, a confidence level of 10% indicates that while a particular portion of the image data may be a particular marker, it probably is not; while a confidence level of 90% indicates that the marker detector is very confident that the image data contains a particular identified marker. Different markers in an image will typically have different confidence levels although it is possible for two markers to have the same confidence level. Marker detector 114 also provides a position of the marker within the image along with transformation data for the marker indicating the orientation of the marker. Marker detector 114 may be part of an AR toolkit. In some embodiments, the AndAR—Android Augmented Reality toolkit available at the Uniform Resource Locator "code.google.com/p/andar" is used to provide the marker detection described above.

Confidence levels for markers can be affected by various factors including the amount of lighting in a room, the type of lighting (e.g., fluorescent, incandescent, halogen), reflections in the image data, the characteristics of the camera producing the image, the angle and position of the camera relative to the marker.

Figure 2:
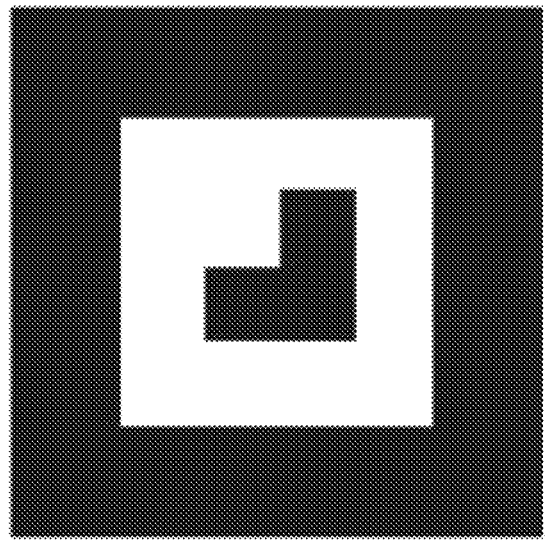
FIG. 2 depicts example markers.
Figure 2:
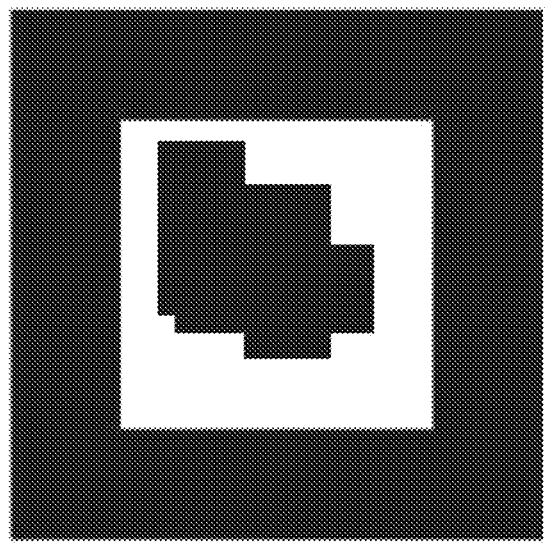

FIG. 2 depicts example markers 108 and 110 in further detail. In the example illustrated in FIG. 2, example markers 108 and 110 have a white outer border and a black inner boarder. The interior of markers 108 and 110 comprises a black shape that is asymmetric. The shape of a marker is unique among a set of markers and is used to identify a marker. Further, markers have a uniform size and shape (square). These characteristics are used by AR system 102 and marker detector 114 to determine various characteristics from image data 118. For example, AR system 102 can use the apparent size of the marker to determine a distance between the camera and the marker. Further, AR system 102 can use the rotation of a marker to determine a camera angle of the camera with respect to the marker.

Returning to FIG. 1, position calculator 116 uses the image data for a marker, the characteristics of the marker (e.g., size, rotation, transformation), and the position of the marker obtained from object repository 112 to determine a position of user device 104 relative to the marker.

Although shown as separate components in FIG. 1, the components illustrated in FIG. 1 may be distributed in different manners. For example, in some embodiments, AR system 102 and object repository 112 can be integrated with user device 104.

Further details on the operation of the above described system are provided below with respect to FIG. 3.

Figure 3:
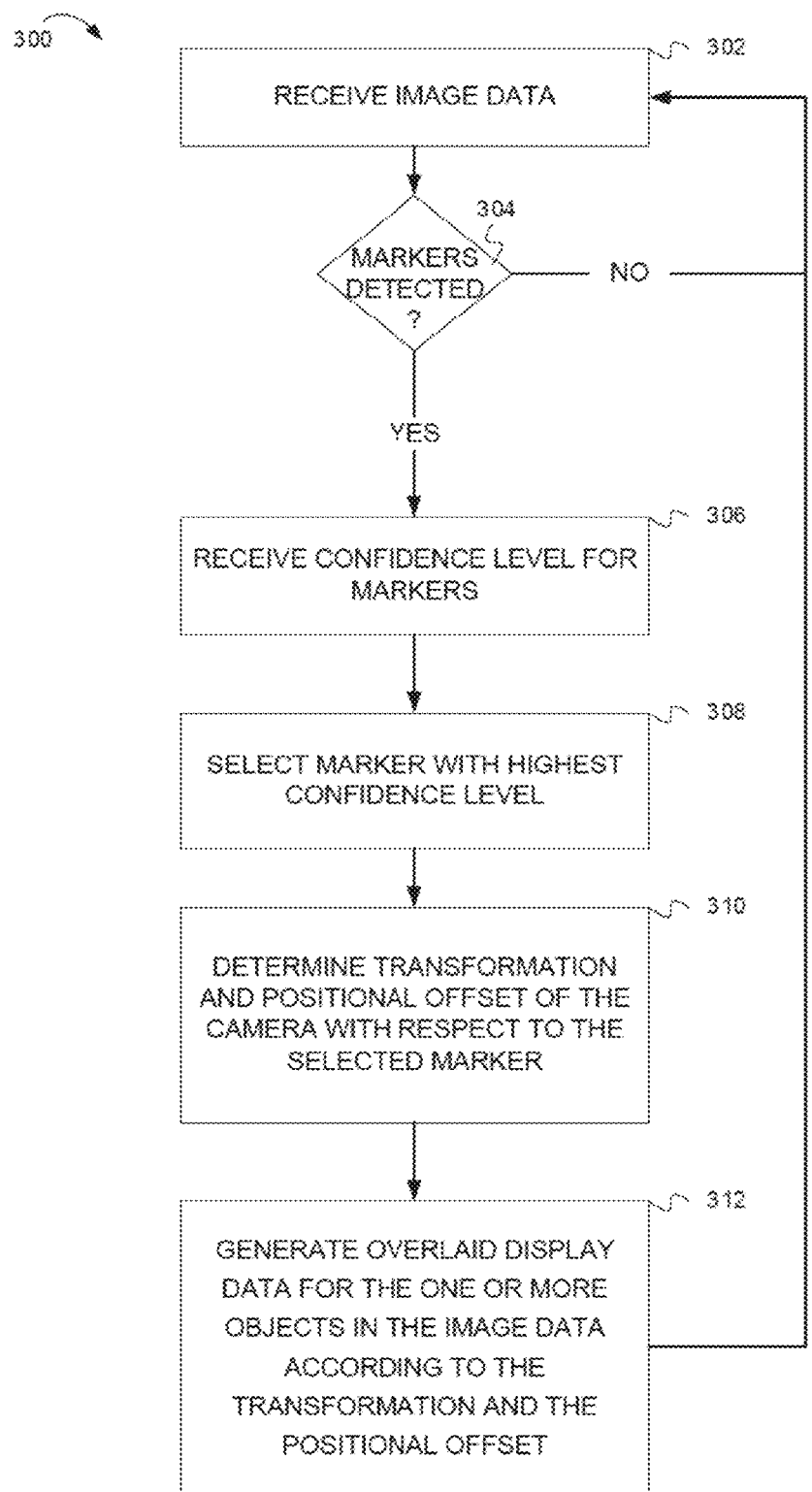
FIG. 3 depicts a flowchart of an example method for determining positional context using multiple markers.

FIG. 3 depicts a flowchart of an example method 300 for determining positional context using multiple markers. The method begins at block 302 with AR system 102 receiving image data from a camera.

At block 304, AR system 102 uses marker detector 114 to determine if any markers are present in the image data received at block 302. The marker detector 114 scans the image data to determine if any portion of the image data represents a known marker. If no markers are detected in the image data, then the AR system returns to block 302 to receive new image data from the user device.

If the check at block 304 determines that markers are potentially present in the image data, then the AR system proceeds to block 322 to receive confidence levels for each of the markers that are potentially present in the image data. In some embodiments, the process of identifying potential markers also determines a confidence level regarding the confidence determined by the marker detector that the portion of the image actually represents a marker. This confidence level is saved along with other details regarding the potential marker such as the identity of the potential marker and its position in the image data.

At block 308, the AR system selects the marker having the highest confidence level from the markers detected in the image data. In some embodiments, the identity of the selected marker is saved for future use in tie-breaking operations. In such embodiments, in the case where two markers have the same confidence level and the confidence level is the highest detected among all the markers, the system will select the most recently used marker to break the tie.

At block 310, the system determines transformation parameters and positional offset parameters for the camera with respect to the selected marker. The AR system uses the marker rotation values to determine a camera angle with respect to the marker. In addition, the AR system can use the size of the marker in the image data to determine how far away the camera is from the marker. The identity of the marker, the transformation parameters, and the positional offset are then used to determine positions of objects in the image data. The position of objects can be determined in relation to the position determined for the selected marker. The AR system determines the identity of the selected marker and can use the identity to retrieve the selected marker's position from object repository. Further, the AR system can access the object repository to retrieve object identifiers for objects around the selected marker based on the selected marker's position and the positions of objects in proximity to the selected marker.

At block 312, the AR system generates overlaid display data for one or more objects in the image data using the position and transformation data determined at block 310. The overlaid display data can include various forms of information about the objects viewable in the image data. AR system 102 can obtain the data from object repository 112. Further, AR system 102 can use the object identifier to obtain information about an object from other data sources, including the object itself. For example, an identifier and description of the object can be displayed over or near the object. Further characteristics can be displayed depending on the type of object in the image. Continuing the example illustrated in FIG. 1 where the objects are rack mounted computer systems, information regarding a rack mounted computer system may be displayed such as operating temperature, temperature limits, and performance data. The performance data may include data such as memory used and percentage of CPU time used by the rack mounted computer system.

In some embodiments, the AR system incorporates the overlaid display data into the image at positions determined using the transformation and positional offset data determined for the selected marker, and the position of the objects in the image. Further, the position of the overlaid data may be adjusted so that it appears on top of, or alongside of, the object that the overlaid data is associated with. The image data is then sent to the user device for presentation on a display on the user device.

In alternative embodiments, the AR system receives a selection of an object using a user interface on the user device. Alternatively, an object of interest is selected by pointing the camera at the object of interest such that the object of interest is centered in the display frame. In either case, the AR system incorporates overlaid display data into the image for the selected object over the image data for the selected object.

Figure 4:
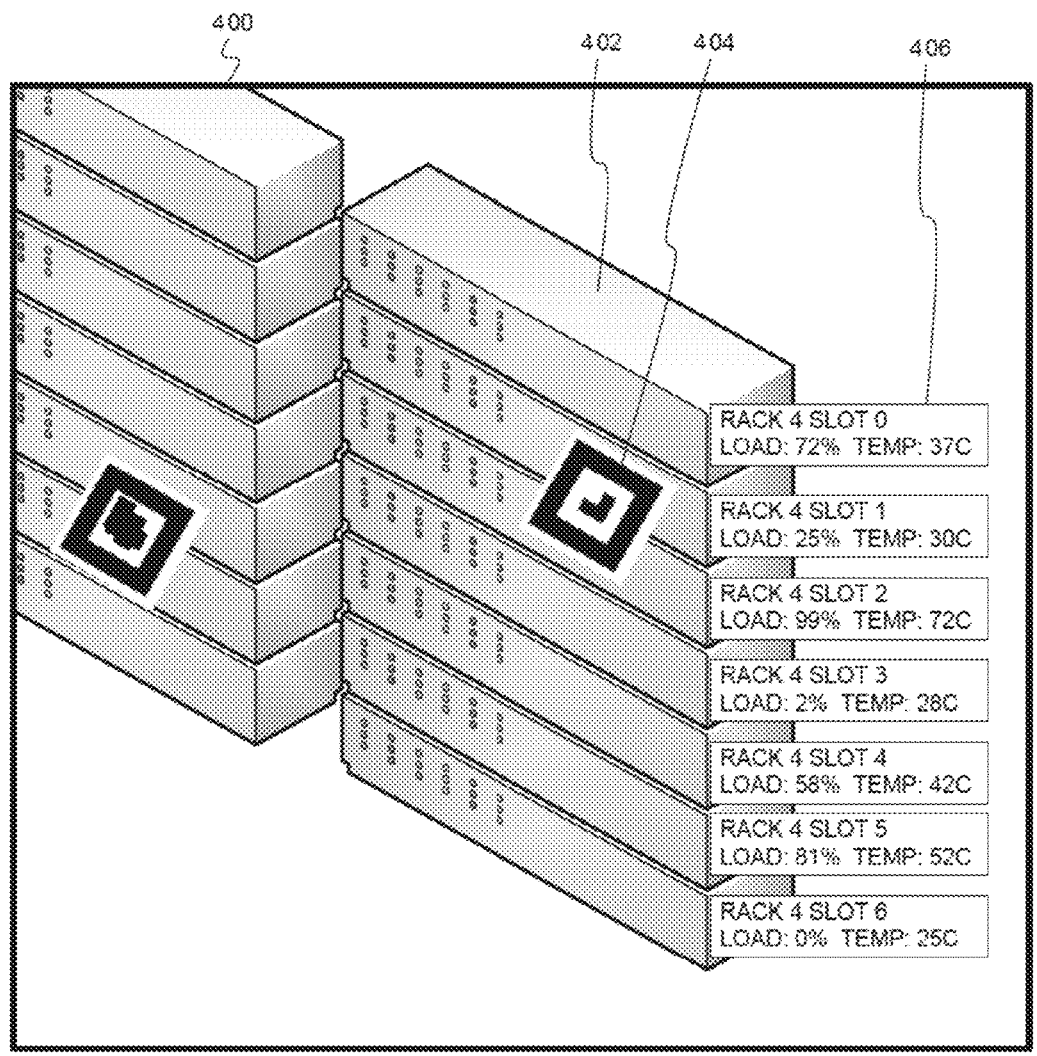
FIG. 4 depicts an example image having overlaid data for objects in the image.

FIG. 4 depicts an example image 400 having overlaid data for objects in the image. In the example illustrated in FIG. 1, AR system 102 receives image data of objects 106, which in the example are rack mounted computer systems. Object image 402 represents the image data for an object 106. Marker image 404 represents the image data for marker 108, which in the example presented in FIG. 4 is a marker selected as described above. Overlaid image data 406 comprises information about object 106. In the example illustrated in FIG. 4, such information include a rack and slot for the actual object, and real-time data such as operating load and temperature for the rack mounted computer shown as object image 402. AR system 102 positions overlaid image data 406 according to the transformation data, positional offset, and position data determined above for the selected marker and for the objects appearing in the image 402.

The depicted flowchart is provided as an example to aid in understanding embodiments, and should not be used to limit embodiments. Embodiments can perform additional operations, fewer operations, operations in parallel or operations in a different order.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software or micro-code) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
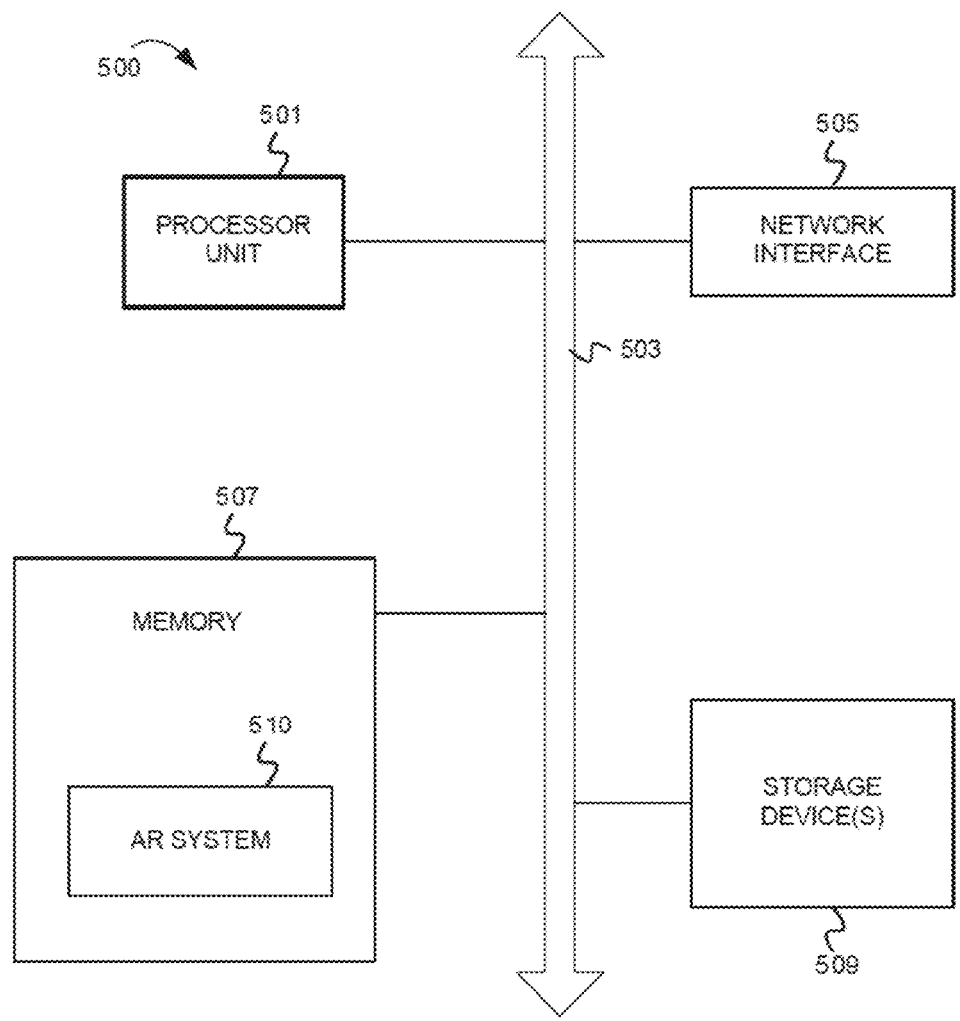
FIG. 5 depicts an example computer system.

FIG. 5 depicts an example computer system. A computer system includes a processor unit 501 (possibly including multiple processors, multiple cores, multiple nodes, and/or implementing multi-threading). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, or PRAM) or any one or more of the above already described possible realizations of machine-readable media. The computer system also includes a bus 503 (e.g., PCI, ISA, PCI-Express, HyperTransport®, InfiniBand® or NuBus), a network interface 505 (e.g., an ATM interface, an Ethernet interface, a Frame Relay interface, SONET interface or wireless interface), and a storage device(s) 509 (e.g., optical storage or magnetic storage). The system memory 507 embodies functionality to implement embodiments described above. The system memory 507 may include one or more functionalities such as components 510 of augmented reality system 102 that facilitate identification of markers in an image and selecting a marker with a highest confidence level to determine positions of information to be overlaid in the image as described above. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card. Further, realizations may include fewer or additional components not illustrated in FIG. 5 (e.g., video cards, audio cards, additional network interfaces or peripheral devices). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for identifying markers in an image and selecting a marker with a highest confidence level to determine positions of information to be overlaid in the image as described above as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer implemented method for augmenting a display image, the method comprising:
   receiving image data, the image data including data representing one or more objects, and at least a first marker and a second marker;
   receiving a first confidence level for the first marker and a second confidence level for the second marker;
   determining a selected marker from the first marker and the second marker, the selected marker determined according to a highest confidence level of the first confidence level and the second confidence level, wherein upon determining that the first confidence level and the second confidence level are equal, selecting a marker from the first marker and the second marker that was most recently selected;
   determining a transformation and a positional offset for the selected marker, wherein the transformation for the selected marker comprises an orientation of the selected marker;
   determining positions of the one or more objects relative to the selected marker based on an identity of the selected maker, the orientation of the selected marker, and the positional offset for the selected marker;
   retrieving identifications of the one or more objects;
   generating overlaid display data for the one or more objects in the image data, the one or more objects determined in accordance with the transformation and the positional offset; and
   overlaying the overlaid display data onto the image data at locations relative to the image data that are derived from the positions of the one or more objects relative to the selected marker.

2. The method of claim 1, and further comprising:
   displaying the overlaid display data for at least one of the one or more objects, a position of the overlaid display data determined in accordance with the transformation and the positional offset.

3. The method of claim 1, and further comprising:
   receiving a selection of an object of the one or more objects; and
   displaying the overlaid display data for the selected object, a position of the overlaid display data determined in accordance with the transformation and the positional offset.

4. The method of claim 1, and further comprising:
   identifying an object of the one or more objects;
   retrieving data for the object; and
   including at least a portion of the data in the overlaid display data for the one or more objects.

* * * * *